(12) United States Patent
Braganza et al.

(10) Patent No.: US 11,886,061 B2
(45) Date of Patent: Jan. 30, 2024

(54) RESILIENT WRITING DEVICE

(71) Applicant: Kent Displays, Inc., Kent, OH (US)

(72) Inventors: Clinton I. Braganza, Kent, OH (US); Hunter Morris, Kent, OH (US)

(73) Assignee: Kent Displays, Inc., Kent, OH (US)

( * ) Notice: Subject to any disclaimer, the term of this patent is extended or adjusted under 35 U.S.C. 154(b) by 0 days.

(21) Appl. No.: 17/567,726

(22) Filed: Jan. 3, 2022

(65) Prior Publication Data
US 2023/0213799 A1 Jul. 6, 2023

(51) Int. Cl.
*G02F 1/1333* (2006.01)
*G02F 1/1343* (2006.01)
(Continued)

(52) U.S. Cl.
CPC ...... *G02F 1/133305* (2013.01); *G02F 1/1339* (2013.01); *G02F 1/13338* (2013.01); *G02F 1/13718* (2013.01); *G02F 1/134309* (2013.01)

(58) Field of Classification Search
CPC .......... G02F 1/133305; G02F 1/13338; G02F 1/1339; G02F 1/134309; G02F 1/13718
See application file for complete search history.

(56) References Cited

U.S. PATENT DOCUMENTS

| | | |
|---|---|---|
| 6,104,448 A | 8/2000 | Doane et al. |
| 8,228,301 B2 | 7/2012 | Schneider |

(Continued)

OTHER PUBLICATIONS

U.S. Appl. No. 17/380,812.
U.S. Appl. No. 17/168,507..

*Primary Examiner* — Nathanael R Briggs
(74) *Attorney, Agent, or Firm* — Serbinowski PLLC (57) ABSTRACT

A writing device includes a liquid crystal layer including cholesteric liquid crystal material. There are electrically conductive layers between which the liquid crystal layer is disposed. There is a front writing surface layer that is transparent and a back support layer between which the electrically conductive layers and the liquid crystal layer are disposed. The cholesteric liquid crystal material changes in texture by application of pressure to the front writing surface layer to create an image. A seal confines the cholesteric liquid crystal material between the front writing surface layer and the back support layer. The electrically conductive layers are adapted to enable a voltage waveform to be applied thereto that erases the image. In one aspect, the resilience to bending the writing device is defined by enabling the writing device to be bent to a radius of curvature of 100.0 millimeters for 10 repetitions of the bending and after each of the repetitions of the bending the voltage waveform completely erases the image. In another aspect, the back support layer comprises a first sublayer formed of a flexible polymeric material adjacent to the back electrically conductive layer, a second sublayer comprising a backer that is flexible and thicker and of a different material than the first sublayer and a bonding layer located between the first sublayer and the second sublayer. In yet another aspect, the seal includes an elastomeric material and wherein the front writing surface layer has a thickness in a range of 0.5 to 4.5 mils and the back support layer has a thickness in a range of 0.6 to 34.5 mils.

35 Claims, 7 Drawing Sheets

(51) Int. Cl.
    *G02F 1/137*    (2006.01)
    *G02F 1/1339*   (2006.01)

(56) References Cited

U.S. PATENT DOCUMENTS

| | | |
|---|---|---|
| 8,958,048 B2 | 2/2015 | Braganza et al. |
| 9,651,813 B2 | 5/2017 | Morris et al. |
| 9,651,831 B2 | 5/2017 | Nakamura |
| 10,558,065 B2 | 2/2020 | Marhefka |
| 10,739,631 B2 | 8/2020 | Lightfoot et al. |
| 2013/0070184 A1* | 3/2013 | Morris .............. G02F 1/133305 349/88 |
| 2015/0062525 A1* | 3/2015 | Hirakata ............. H04M 1/0268 349/158 |
| 2017/0104090 A1* | 4/2017 | Koezuka ............. H01L 29/7869 |
| 2018/0335679 A1* | 11/2018 | Hashimoto ......... G02F 1/13338 |
| 2020/0026106 A1* | 1/2020 | Lightfoot .................. B43L 1/00 |

\* cited by examiner

Prior Art

RESILIENT WRITING DEVICE

TECHNICAL FIELD

This disclosure relates generally to writing/drawing tablets, and in particular, to robust, flexible cholesteric liquid crystal pressure writing/drawing devices that are resilient to abusive use.

BACKGROUND

In 2010, the Boogie Board® pressure sensitive cholesteric liquid crystal writing tablet of Kent Displays Inc. appeared on the market. It has become a popular paper replacement for household, classroom and office work offering the convenience of writing and drawing with a simple stylus, even a fingernail, and quick erase for repeated use. Over the years, numerous versions of cholesteric writing tablets, large and small, have appeared in the marketplace. The cholesteric liquid crystal writing tablets that have appeared on the market are substantially all constructed the same way in which a pressure sensitive cholesteric liquid crystal writing panel is housed within a rigid plastic casing with a bezel in front that holds it in place. The purpose of the housing is to protect the panel from damage and to accommodate the electronics and button switch needed to erase the written image and initialize the tablet for forming a new image. The housing further provides pressure support for the stylus.

Figure 1A:
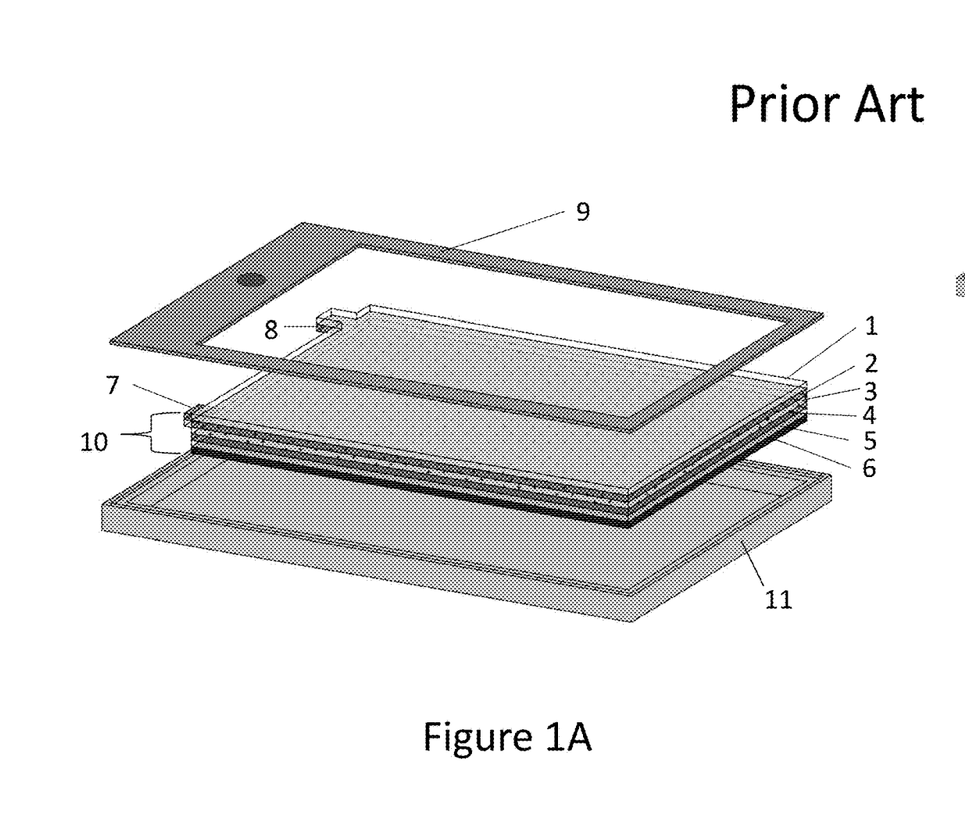
FIG. 1A: Exploded view illustrating the layers of a cholesteric liquid crystal writing tablet of the Prior Art.

As illustrated in the exploded view FIG. 1A, the pressure sensitive liquid crystal writing panel 10 is comprised of a sequence of layers with a front substrate 1, an upper conducting layer 2, a layer of cholesteric liquid crystal material 3, a lower conducting layer 4, a back substrate 5, and light absorbing layer 6, respectively. The front substrate 1 and back substrate 5 support the conducting layers 2 and 4 as illustrated in FIG. 1A. The front substrate 1 is transparent and flexible so that local pressure on the substrate by a pointed stylus can alter the local texture of the cholesteric liquid crystal to reflect light and create an image. The back substrate 5 can be transparent but the device can include an adjacent light absorbing layer 6 that is opaque or semitransparent to create contrast for the light reflecting image. Alternatively, the back substrate 5 can be opaque or semitransparent to serve as the light absorbing layer. A rigid casing 11 houses the writing panel 10, held in place by bezel 9 as illustrated in the exploded view of FIG. 1A as well as in the front view of the assembled tablet, FIG. 1B. The casing 11 and the bezel 9 are sufficiently rigid to protect the writing panel 10 by preventing significant flexing from occurring when used as a writing or drawing tablet. The casing 11 further supports the pressure of the stylus when writing. Because of the protection provided by the combined rigid casing 11 and bezel 9 the cholesteric liquid crystal layer 3 may need be only weakly or partially sealed between the front and back substrates 2 and 4 being protected from significant bending or flexing which can delaminate the layers and damage the writing tablet. Cholesteric liquid crystal writing and drawing tablets of the prior art are made resilient to abusive use, avoiding significant bending or flexing since the writing panel 10 is protected from delamination or otherwise damage by the rigid casing 11 and the rigid bezel 9.

Figure 1B:
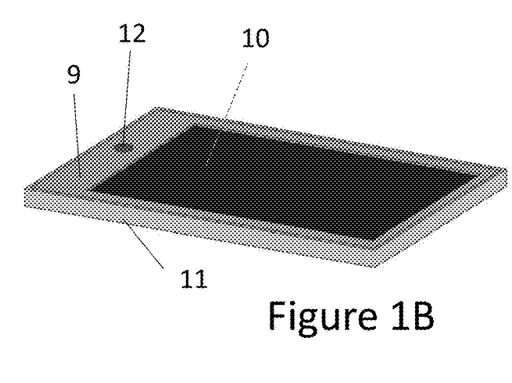
FIG. 1B: Illustration of an assembled cholesteric liquid crystal writing tablet of the Prior Art.
Figure 1C:
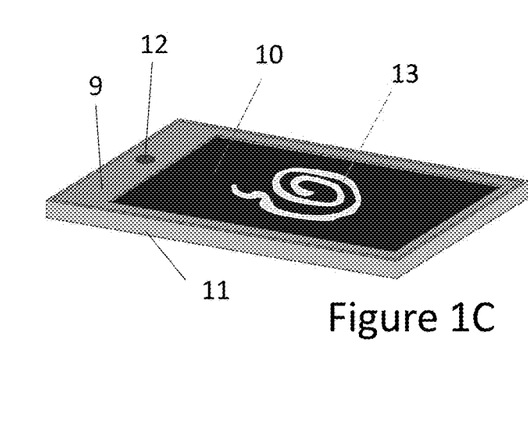
FIG. 1C: Illustration of an assembled cholesteric liquid crystal writing tablet of the Prior Art with an image written on the writing tablet.

The casing 11 is usually made of rigid plastic and can flex only slightly as the housing needs to be rugged for normal use with casing 11 further supplying pressure support for the stylus. When one presses on the top substrate of the writing panel 10 with a pointed stylus or fingernail, the front substrate locally deforms causing the liquid crystal to flow, thereby changing its optical texture from the focal conic transparent texture to the brilliant, reflective color planar texture. Where pressure is applied by a pointed object, an image 13 is therefore formed on the writing panel 10 as illustrated in FIG. 1C by a figure such as sketched with the pointed object. The reflective color of the image contrasts well with the opaque or semitransparent color below the liquid crystal layer. An image formed by the stylus or fingernail will remain on the tablet indefinitely without application of a voltage until erased. Erasure can be accomplished with the writing panel being cleared by a press button switch 12 that applies voltage waveforms to transparent conducting electrodes 2 and 4 exposed on ledges 8 and 7, respectively, on the inner surfaces of the substrates 1 and 5, that drives the cholesteric liquid crystal from its color reflective state back to its focal conic transparent state initializing or clearing the writing panel for a new image as illustrated in FIG. 1B. The erase electronics (not shown) that supplies the voltage waveforms is housed inside the casing 11. The above-described principle of operation is disclosed in more detail in U.S. Pat. No. 6,104,448, with erase voltage waveforms disclosed in U.S. Pat. No. 10,558,065, which are incorporated herein by reference.

Cholesteric liquid crystal writing tablets have been disclosed for use without the panel being housed in a casing, termed liquid crystal paper, as disclosed in U.S. Pat. No. 9,651,813. Without a casing, the liquid crystal paper devices need to be placed on a rigid or hard surface for writing or drawing as there is no casing to provide pressure support for the stylus. An issue arises, however, in that, without a casing, these liquid crystal paper devices are not very rugged for handling and, in particular, abusive handling can delaminate the liquid crystal paper if not sufficiently packaged in a rigid framework or casing. U.S. Pat. No. 9,651,813 specifically discloses a casing in contact with the substrates can ruggedize the liquid crystal paper. A packaging means was disclosed in U.S. Pat. No. 9,651,813 that consisted of a 1.5 mm thick black acrylic sheet behind the display and a 200 µm thick black PET frame in front of the display. The black PET frame had 50 µm thick pressure sensitive adhesive (3M) laminated to it allowing the frame to adhere to the display perimeter and the edge of the acrylic backplane. Being insufficiently resilient to abusive use without a casing the liquid crystal paper device was never commercialized.

U.S. Pat. No. 8,958,048 discloses a gasket formed of cured adhesive material disposed around a perimeter of a cholesteric liquid crystal writing/drawing panel between front and back substrates for improving its ruggedness. The gasket provides a complete seal along the whole perimeter of the cholesteric writing tablet. As an internal gasket, it is contained within the substrates and therefore prevents delamination and edge top to bottom shorts thus increasing yield. The gasket is compatible and inert with respect to the cholesteric liquid crystal material such that it still has adhesive properties after the dispersion material contacts it without contaminating the liquid crystal. However, while providing improved ruggedness the gasket does not prevent delamination that can occur particularly with substrates of thicknesses used in commercial writing panels prior art.

U.S. Pat. No. 10,739,631 discloses a unique pressure support for the stylus providing enhanced line acuity. An adhesive layer with the proper adhesive properties is disposed between the lower electrically conductive layer and a backing so that users can write or draw clear and crisp lines, maintaining sharp line acuity further reducing the visual effect of particles and in general improving aesthetic yield.

The disclosed backing of a liquid crystal writing device reinforces the writing surface so that users can write or draw upon it with clear and crisp lines. The backing was not designed for ruggedizing the tablet for flexing such as bending, twisting or rolling the tablet. The pressure support disclosed in this patent is designed for writing clear, crisp lines with a rigid backing of aluminum clad plastic disclosed in the patent. A mechanical clamp structure is disclosed for securing the display in a surrounding casing.

Writing tablets of the prior art are not sufficiently rugged for abusive or harsh use without being enclosed within a casing. The casing, while improving ruggedness, limits the flexibility, adds weight, and bulkiness. Further, commercial writing tablets of the prior art have thick substrates with thicknesses being generally around 5 mils or larger with the front substrate 1 and back substrate 2 made of the same material. The panels of such writing tablets are not very pliable or flexible, and will delaminate if bent too sharply. Moreover, writing panels of the prior art appearing in the marketplace, are often weakly sealed particularly in the vicinity of the ledges where laser welds are avoided. Laser welds near the ledges are avoided because a laser weld can sever or short conductor 2 to 4 destroying the erase mechanism. For convenience and cost, laser welds to seal the panel are often made while cutting the panel from the manufacturing web. Such laser welds, particularly on thick substrates, 5 mils or greater, will rupture under severe bending causing the seal to break permitting a damaging air bubble.

SUMMARY OF THE DISCLOSURE

This disclosure is directed to a writing device that is flexible, yet rugged and resilient to abusive use. The writing device requires no rigid casing with bezel to house the display but is ruggedized by a flexible back support layer that further provides support for the writing pressure of a stylus. The back support layer is a key part of the writing device allowing it to lay flat on a surface, reduce kinking, absorb shock and provide aesthetic and useful features such as color, design, slip resistance, etc. The writing surface layer of the writing device is unusually thin compared to prior art substrates which, in concert with the design of back support layer, aids in further ruggedizing the writing device. The overall thickness of the writing device is thin, flexible and resilient to damage when bent repeatedly at a radius of curvature of at least 100 mm and even to smaller radii. The writing device can be small resembling a Post It Note® sheet on which to take notes or leave messages but with the added feature of being erased and reused many thousands of times over. Like a Post It Note® sheet, it can be void of electronics, and attached to a wall or other surface for viewing. Being thin and flexible many writing devices of this disclosure can be stacked in a small package similar to paper index cards.

Turning now to a description of a first general aspect of the disclosure, a writing device comprises a liquid crystal layer including cholesteric liquid crystal material. The writing device includes a front electrically conductive layer and a back electrically conductive layer between which the liquid crystal layer is disposed. The writing device includes a front writing surface layer that is transparent and a back support layer between which the front electrically conductive layer, the back electrically conductive layer and the liquid crystal layer are disposed. A seal confines the cholesteric liquid crystal material between the front writing surface layer and the back support layer. The cholesteric liquid crystal material changes in texture by application of pressure to the front writing surface layer to create an image. The electrically conductive layers are adapted to enable a voltage waveform to be applied thereto that erases the image. The writing device is resilient to bending as defined by enabling it to be bent to a radius of curvature of 100.0 millimeters for 10 repetitions of the bending and after each of the repetitions of the bending the voltage waveform completely erases the image, initializing the writing device.

Referring now to specific features of the first aspect of the disclosure, the writing device is resilient to bending as defined by enabling it to be bent to a radius of curvature of 50.0 millimeters for 10 repetitions of the bending and after each of the repetitions of the bending the voltage waveform completely erases the image, initializing the writing device. Further, the writing device is resilient to bending as defined by enabling it to be bent to a radius of curvature of 20.0 millimeters for 10 repetitions of the bending and after each of the repetitions of the bending the voltage waveform completely erases the image, initializing the writing device. Still further, the writing device is resilient to bending as defined by enabling it to be bent to a radius of curvature of 10 millimeters for 10 repetitions of the bending and after each of the repetitions of the bending the voltage waveform completely erases the image, initializing the writing device.

In another feature the front writing surface layer comprises a flexible polymeric material with a thickness that is at least 0.5 mils.

In another feature the back support layer is multilayered.

In yet another feature the back support layer comprises a first sublayer comprising a flexible material adjacent to the back electrically conductive layer, a second sublayer comprising a backer that is flexible and a bonding layer located between the first sublayer and the second sublayer. Another feature is that the second sublayer is formed of a different material than the first sublayer. Another feature is that the first sublayer comprises a flexible polymeric material with a thickness that ranges between 0.5 to 4.5 mils. In yet another feature the second sublayer comprises a flexible material with a thickness that ranges between 0.1 and 30 mils. Still further, the bonding layer is selected from any one of a pressure sensitive adhesive layer, UV curable adhesive layer, thermally curable adhesive layer, ultrasonic welding layer, and thermoset adhesive layer and combinations thereof. Moreover, the second sublayer can be opaque or semitransparent. More particularly, at least one of the first sublayer and the second sublayer has a color. In another feature at least one of the first sublayer and the second sublayer has graphics on at least one side. Further, the second sublayer is textured on at least one side. Yet another feature is that at least one of the first sublayer and the second sublayer is transparent.

In another feature the writing device comprises exposed terminals and a magnet that underlies the terminals.

Another feature is that included in the writing device is a stylus for erasing the image comprising a magnet in the vicinity of stylus terminals.

Referring to further features of the general first aspect, the back support layer comprises a flexible polymeric material with a thickness that ranges between 0.5 and 30.0 mils. In a further feature, the back support layer can be transparent. In another feature, the back support layer is opaque or semitransparent. Yet another feature is that the back support layer has a color. Still further, the back support layer can have graphics on at least one side. Lastly, is the feature in which the back support layer is textured on at least one side.

A second aspect of the disclosure is a writing device comprising a liquid crystal layer including cholesteric liquid crystal material. The writing device includes a front electrically conductive layer and a back electrically conductive layer between which the liquid crystal layer is disposed. The writing device includes a front writing surface layer that is transparent and a back support layer between which the front electrically conductive layer, the back electrically conductive layer and the liquid crystal layer are disposed. A seal confines the cholesteric liquid crystal material between the front writing surface layer and the back support layer. The cholesteric liquid crystal material changes in texture by application of pressure to the front writing surface layer to create an image. The electrically conductive layers are adapted to enable a voltage waveform to be applied thereto that erases the image. The back support layer comprises a first sublayer formed of a flexible polymeric material adjacent to the back electrically conductive layer, a second sublayer comprising a backer that is flexible and thicker and of a different material than the first sublayer and a bonding layer disposed between the first sublayer and the second sublayer.

Referring now to specific features of the second aspect of the disclosure the writing device has a resilience to bending defined by enabling it to be bent to a radius of curvature of 100.0 millimeters for 10 repetitions of the bending and after each of the repetitions of the bending the voltage waveform completely erases the image and initializes the writing device.

Another feature is that the first sublayer has a thickness that ranges between 0.5 to 4.5 mils and the second sublayer has a thickness that ranges between 0.1 and 30 mils.

A third aspect of the disclosure is a writing device comprising a liquid crystal layer including cholesteric liquid crystal material. The writing device includes electrically conductive layers between which the liquid crystal layer is disposed. The writing device includes a front writing surface layer that is transparent and a back support layer between which the electrically conductive layers and the liquid crystal layer are disposed. The front writing surface layer has a thickness in a range of 0.5 to 4.5 mils and the back support layer has a thickness in a range of 0.6 to 34.5 mils. The cholesteric liquid crystal material changes in texture upon application of pressure to the front writing surface layer to create an image. A seal formed of elastomeric material extends around a perimeter of the front writing surface layer and the back support layer that confines the liquid crystal material. The electrically conductive layers are adapted to enable a voltage waveform to be applied thereto that erases the image.

Referring to specific features of the third aspect of the disclosure, the writing device has a resilience to bending defined by enabling it to be bent to a radius of curvature of 100.0 millimeters for 10 repetitions of the bending and after each of the repetitions of the bending the voltage waveform completely erases the image and initializes the writing device.

In another feature the back support layer comprises a first sublayer that is a substrate comprised of polymer and having a thickness ranging from 0.5 to 4.5 mils, a second sublayer having a thickness ranging from 0.1 to 30 mils and a bonding layer located between the first sublayer and the second sublayer. The second sublayer is more distal from a user of the writing device than the first sublayer is from the user of the writing device.

Many additional features, advantages and a fuller understanding of the disclosure will be had from the accompanying drawings and the Detailed Description that follows. It should be understood that the above Summary of the Disclosure describes the subject matter of the disclosure in broad terms while the following Detailed Description describes the subject matter of the disclosure more narrowly and presents specific embodiments that should not be construed as necessary limitations of the broad subject matter of the disclosure.

DETAILED DESCRIPTION

Figure 2A:
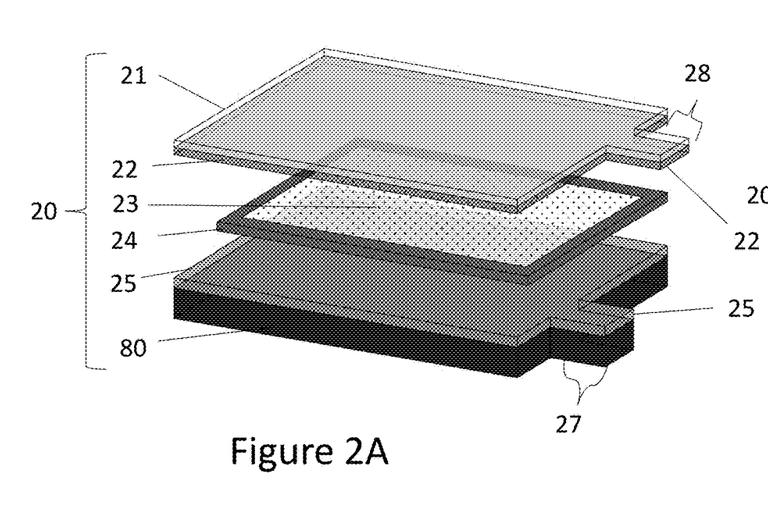
FIG. 2A: Exploded, upper perspective view illustrating layers comprising a writing device of this disclosure which is resilient and includes cholesteric liquid crystal.
Figure 2B:
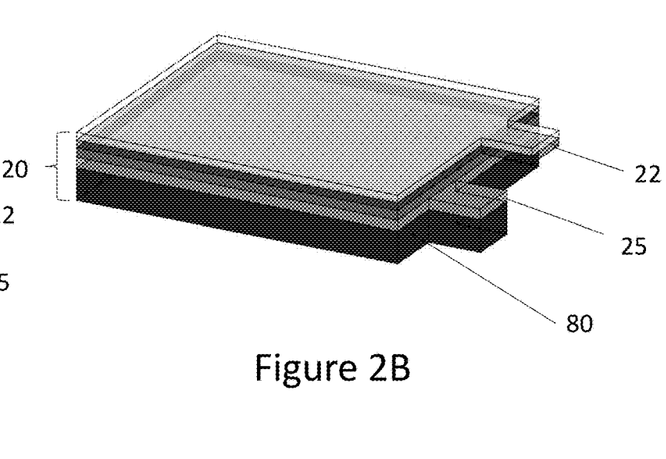
FIG. 2B: Upper perspective view illustrating an assembled writing device of FIG. 2A.

The writing device, resilient to abusive use, includes cholesteric liquid crystal material and is a multilayered structure 20 as illustrated in an exploded view of FIG. 2A and assembled view of FIG. 2B. As illustrated in these figures, a front writing surface layer 21 is transparent and flexible while functioning as a thin robust substrate. The front writing surface layer is a thin polymeric layer with a particular thickness ranging from 0.5 to 4.5 mils (1.0 mil=25.4 microns). This range of thicknesses contributes to providing the writing device with resilience to sharp bends preventing the writing device from being damaged. A damaged writing device structure results in destroying the writing device's ability to be completely erased and initialized for writing new images. Still another feature of the front writing surface layer's thin structure is to allow local deformation from the writing stylus without an underlying rigid support layer that is commonly employed in prior art writing tablet technology. The front writing surface layer's thin structure further assists in preventing structural damage to the writing device as well by allowing less strain to be applied which avoids rupture of the seal 24.

Bonded to the front writing surface layer 21, is a front electrically conductive layer 22 as is known in the prior art and being usually comprised of materials such as indium tin oxide or conducting polymer. A liquid crystal layer 23 follows in sequence from the above layers, comprising a pressure sensitive dispersion. The pressure sensitive dispersion comprises cholesteric liquid crystal material dispersed with a polymer and spacers as is common in the prior art. A seal 24 confines the liquid crystal layer 23. The seal 24 can comprise an elastomeric or adhesive material (e.g., cured adhesive) in a layer such as disclosed in U.S. Pat. No. 8,958,048, which is incorporated herein by reference. A seal that is welded, such as may be implemented by a laser or heat, may be used in some applications; however, a seal of adhesive in particular is used since it not only completely surrounds the liquid crystal in one aspect, but also provides robust flexing of the writing tablet without damage. A seal that is welded may not completely surround the liquid crystal material since welding can easily destroy the ledges of exposed electrically conductive layers. A back electrically conductive layer 25 underlies liquid crystal layer 23 and in one aspect is bonded to the back support layer 80.

One having ordinary skill in the art will realize that this disclosure covers variations in which other materials can be located between the front electrically conductive layer 22 and the front writing surface layer 21 and between the back electrically conductive layer 25 and the back support layer 80. Similarly, other materials can be located between the liquid crystal layer 23 and one or both of the front electrically conductive layer 22 and the back electrically conductive layer 25. Moreover, other layers can be disposed on the front writing surface layer 21 and the back support layer 80, including, for example, antiglare or scratch resistance layers. Also, variations can occur in the liquid crystal layer including more than one liquid crystal layer, and sublayers or regions in a plane of the layer or stacked liquid crystal layers, which are separated by polymer or other material, or not.

Figures 3A, 3B:
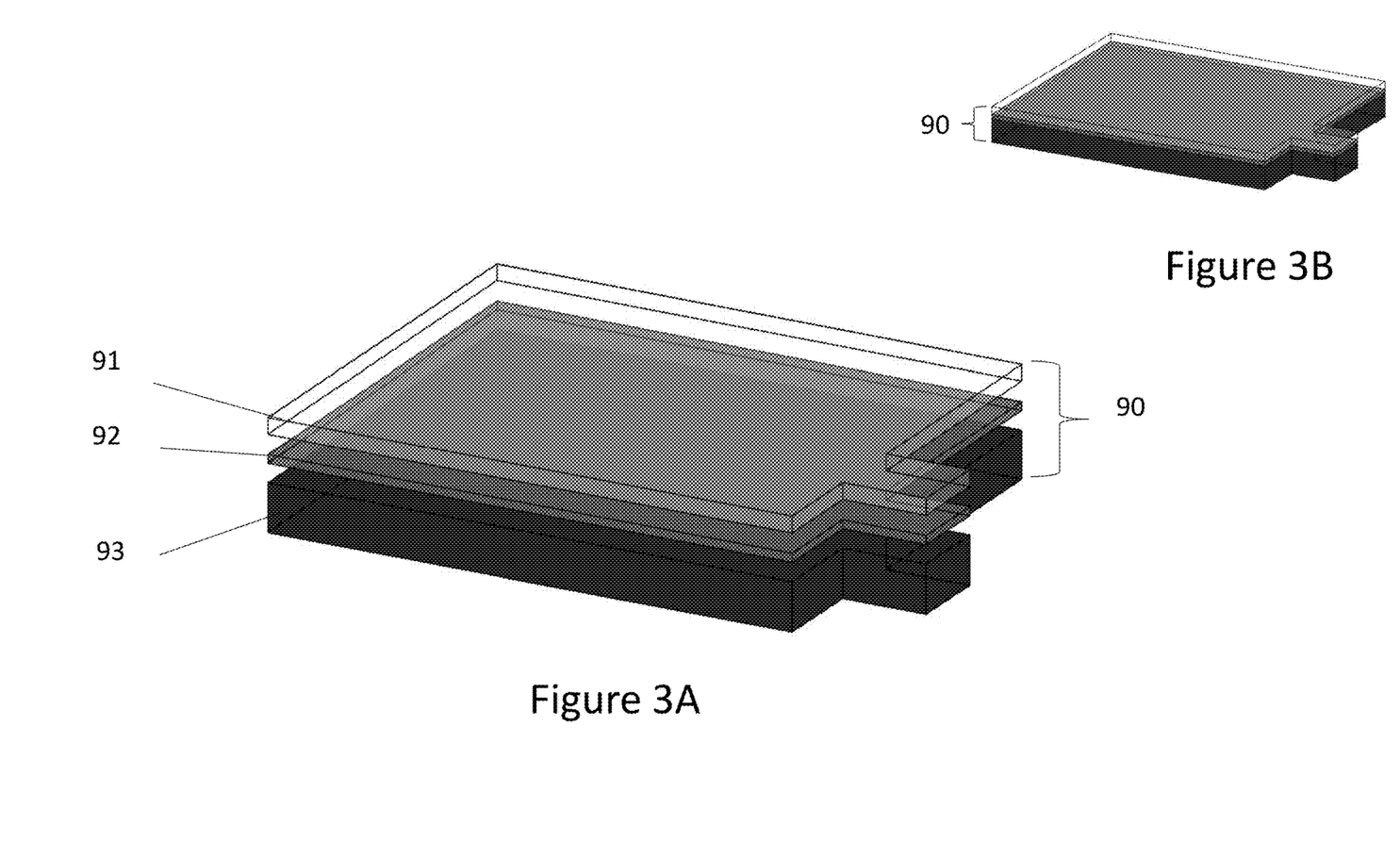
FIG. 3A: Exploded view illustrating the sublayers of the back support layer in its multilayer form.
FIG. 3B: Side view illustrating an assembled back support layer in its multilayer form.

The back support layer 80 is flexible and not only supports pressure for stylus writing but also provides handling functionality to the writing device. It is the mechanical support that contributes to resilience to abusive and harsh treatment that can occur even in normal day to day use of a reusable writing device. The back support layer 80 can further allow the writing device to lay flat on a surface, reduce kinking, absorb shock, and provides slip resistance as well as aesthetic features such as color, design, slip and decoration. The thickness of the back support layer 80 ranges between 0.5 and 30 mils but can be larger to allow pressure support for the stylus and to prevent damage to the front writing surface layer. The back support layer 80 may have a multilayer structure as illustrated in an exploded view in FIG. 3A and assembled view in FIG. 3B. The back support layer in its multilayer form 90 comprises first sublayer 91 in the form of a substrate that is flexible and made of a polymeric material having a preferred thickness ranging from 0.5 to 4.5 mil. The back electrically conductive layer 25 of FIGS. 2A and 2B is coated or otherwise laminated onto the first sublayer 91, which can be a substrate. The second sublayer 93 is a backer that is flexible with features that allow the back support layer to lay flat on a surface, provides pressure support for the stylus and yet is rugged to reduce kinking and absorb shock. The second sublayer 93 can further provide such features as slip resistance, color, design and decoration. The second sublayer 93 can also provide the contrast for the reflective cholesteric liquid crystal image by absorbing selected wavelengths of light. The second sublayer 93 has a thickness ranging from 0.1 to at least 30.0 mils but can be larger. The second sublayer 93 can be of the same or a different material than the first sublayer 91. The first sublayer 91 can also provide features as color, design, decoration, contrast. A bonding layer 92 is located between the first sublayer 91 and the second sublayer 93. The bonding layer 92 may be a pressure sensitive adhesive, in particular, or may be a layer such as that created by heat or ultrasonic weld or a thermal set, thermal or UV cured adhesive.

The seal 24 of FIG. 2A bonds the front writing surface layer 21 to the back support layer 80 or in its multilayer form 90.

A seal 24 that is an adhesive material further allows for confining the liquid crystal at ledges 27 and 28 where portions of the front electrically conductive layer 22 and the back electrically conductive layer 25 are exposed on the ledges 28 and 27, respectively. The ledges are used to enable application of voltage waveforms to the electrically conductive layers to erase written images on the liquid crystal layer and to reinitialize the tablet for future writing. In the case of a seal that is welded, the seal may not be present on or near the ledges (not illustrated in FIGS. 2A and 2B) to avoid electrically shorting the two electrically conductive layers together or destroying the electrical connection between the electrically conductive layer and a conductive lead that is on the ledge, by the laser or heat weld. An insulating layer may be added at the location of ledges 27 and 28 to prevent shorting or damaged electrical connection. Voltage waveforms are applied to the front electrically conductive layer 22 and the back electrically conductive layer 25 on ledges 27 and 28, respectively, to erase an image and/or initialize the writing device to enable writing an image on a cleared surface. In one example, the initialized writing device includes the generally transparent focal conic texture of the cholesteric liquid crystal material throughout substantially all of the viewing area of the front writing surface layer in preparation for writing/drawing an image in the reflective planar texture with the pressure of the stylus on the writing surface 21.

Figures 4A, 4B, 4C:
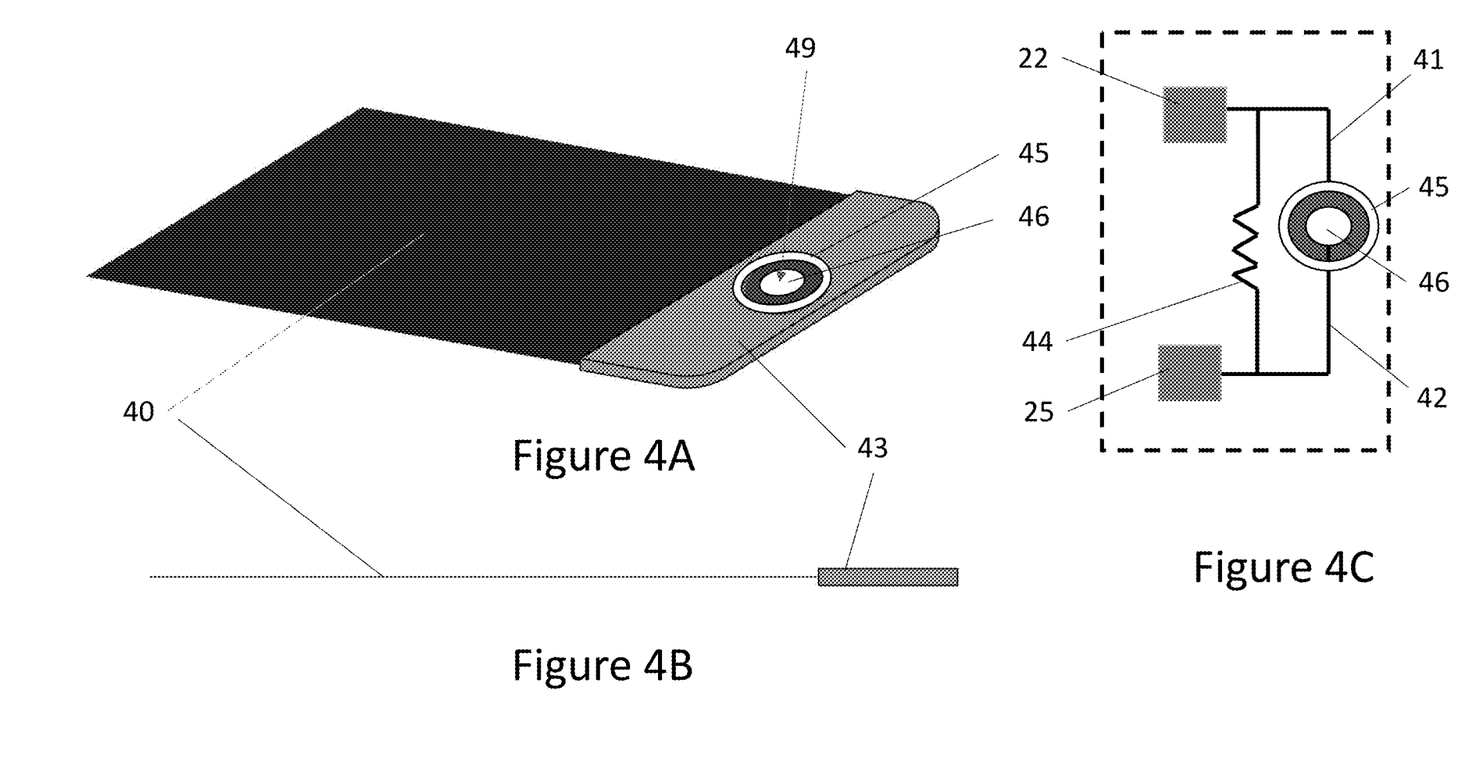
FIG. 4A: Illustration of a front view of a writing device of this disclosure that is resilient and includes cholesteric liquid crystal, with erase terminals being shown.
FIG. 4B: Illustration of a side view of the writing device of FIG. 4A.
FIG. 4C: Circuit diagram for the writing device of FIGS. 4A and 4B including the erase terminals.

FIGS. 4A and 4B illustrate the front perspective and side view, respectively, of a writing device 40 that is resilient and includes capsule 43 attached to the front writing surface and back support layer, comprising exposed terminals 45 and 46 from which to make electrical contact with an erasing stylus. The erasing stylus comprises erase electronics (see U.S. patent application Ser. No. 17/380,812, which is incorporated herein by reference) for erasing an image and initializing the writing device for starting a new image. FIG. 4C shows a circuit diagram of a circuit that is encapsulated within the capsule 43, electrically connecting the terminals 45 and 46 via conductive leads 41 and 42, respectively to the front electrically conductive layer 22 and the back electrically conductive layer 25 (via ledges 28 and 27 of FIG. 2A respectively).

A voltage waveform is applied to terminals 45 and 46 by the erase electronics when electrically in contact with the erasing stylus to erase an image and initialize the writing tablet for starting a new image as disclosed in U.S. patent application Ser. No. 17/380,812. An optional magnet 49 is located underneath terminals 45 and 46 (not shown in FIG. 4A or 4B) for attracting the stylus to the exact location of the terminals for electrical contact. The optional magnet 49 can also be used for conveniently stacking multiple writing tablets together in which the magnet of one writing tablet is attracted to the magnet of an adjacent writing tablet holding them together. An optional resistor 44 has multiple functions of: 1) automatically actuating the stylus to apply the voltage waveform for erasing upon electrical contact with the terminals 45 and 46 and; 2) allowing immediate writing on the writing tablet following erasure and initialization. Voltage waveforms for erasing the writing tablet are disclosed and described in U.S. Pat. No. 10,558,065, which is incorporated by reference.

Figures 5A, 5B:
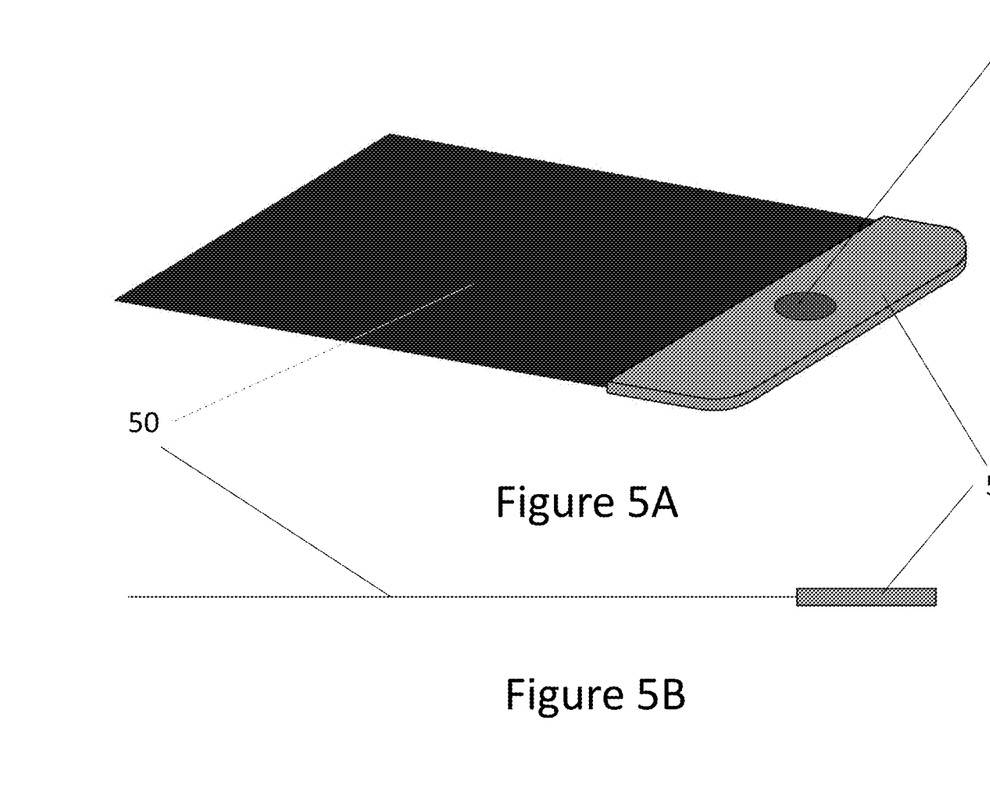
FIG. 5A: Illustration of a front view of a writing device of this disclosure including cholesteric liquid crystal and erase electronics.
FIG. 5B: Illustration of a side view of the writing device with erase electronics of FIG. 5A.
Figure 5C:
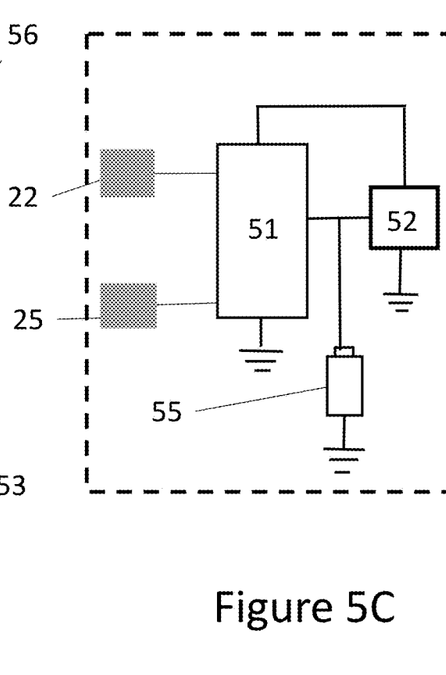
FIG. 5C: Circuit diagram for the erase electronics of the writing device of FIGS. 5A and 5B.

FIGS. 5A and 5B illustrate the front perspective and side view, respectively, of a writing device 50 that is resilient and includes capsule 53 attached to the front writing surface and back support layer, comprising erase electronics of Figure SC for erasing an image and initializing the writing device for the start of a new image. The circuit diagram for the erase electronics shown in Figure SC comprises a microprocessor 51, battery 55, and an actuator 52, the latter of which could be a mechanical press button switch or a magnetically activated switch activated when in close proximity with a magnet or some other activator such as disclosed in U.S. patent application Ser. No. 17/168,507, which is incorporated herein by reference. The actuator 52 is located on or within capsule 53 at location 56. Microprocessor 51 is connected to the front electrically conductive layer 22 and the back electrically conductive layer 25 (via ledges 28 and 27 respectively of FIG. 2A) for supplying the voltage waveform to the electrically conductive layers thereby erasing an image and initializing the writing tablet for the start of a new image.

Figure 6A:
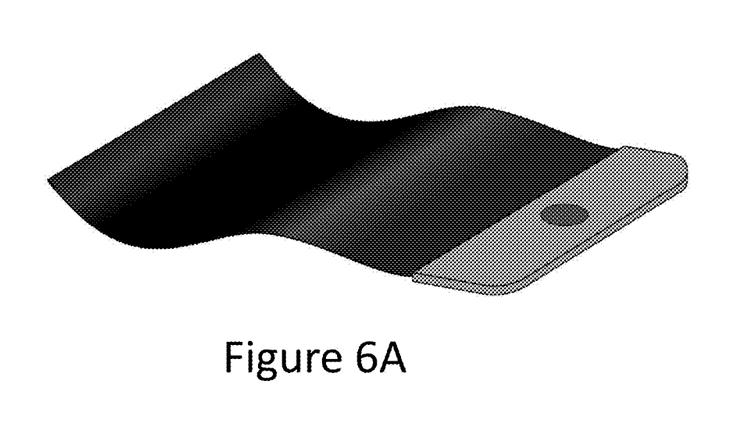
FIG. 6A: Illustration of the flexibility of a writing device of this disclosure flexed with a double bend.
Figure 6B:
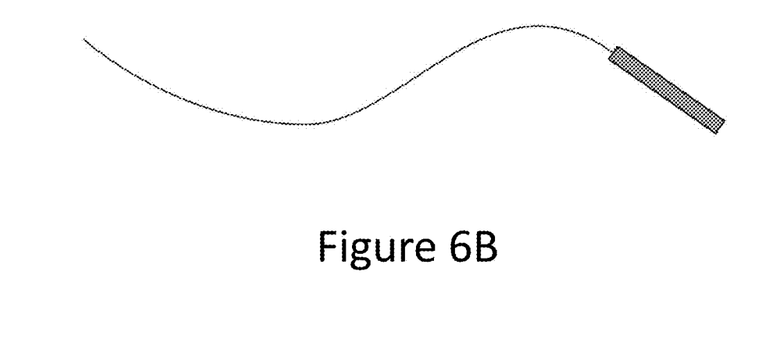
FIG. 6B: Illustration of a side view of the writing device in FIG. 6A.
Figure 6C:
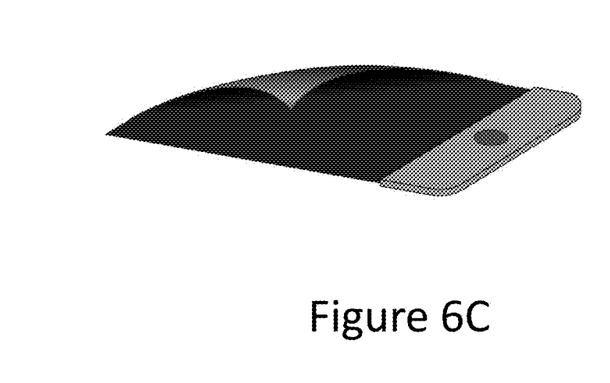
FIG. 6C: Illustration of the flexibility of a writing device of this disclosure flexed by twisting.

The writing device of this disclosure is highly flexible. FIG. 6A illustrates this flexibility with a three dimensional view of a double bend with FIG. 6B illustrating the same double bend in a side view which further illustrates the thin structure. An illustration of a twist bend is shown in FIG. 6C. The writing device of this disclosure is robust to extreme bends with a radius of curvature of 100 mm or smaller without damaging the structure of the writing device such as permanent delamination of the layers, breaking a seal, allowing an air bubble in the liquid crystal layer or breaking the electrical connection to the erase voltage waveform. If not robust against these and other structural damages, the operation of the writing device becomes damaged. A damaged device will be partially or fully non-operational. A resiliency test for robustness is to determine the ability of the writing device to erase and completely clear or totally reinitialize for the next image. If the writing device will not erase an image and transform the entire area of the cholesteric liquid crystal to the focal conic texture, the writing device is deemed to be damaged.

Figure 7A:
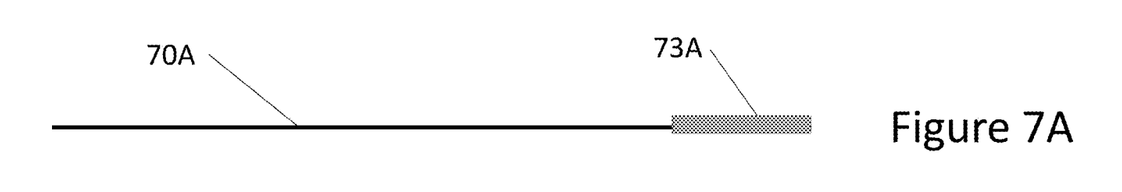
FIG. 7A: Illustration of a side view of a writing device of this disclosure during the start of the resiliency test discussed below.
Figure 7B:
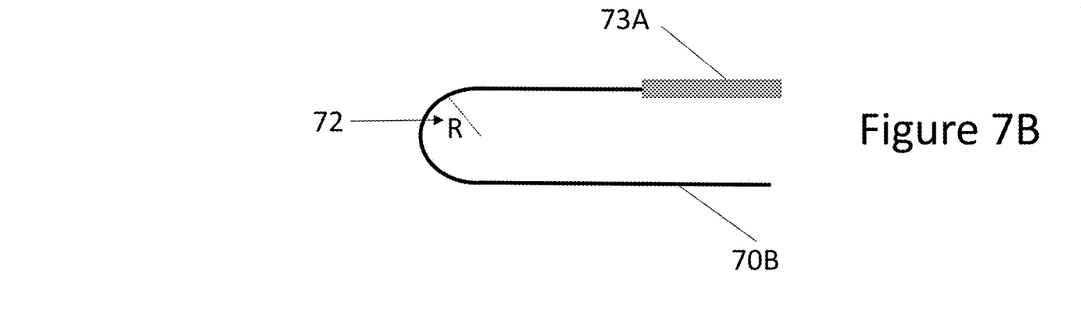
FIG. 7B: A side view illustration of the writing device of FIG. 7A during a step in the resiliency test in which the writing tablet is bent at a specific radius of curvature, R.

FIGS. 7A and 7B illustrate the resiliency test for robustness for the writing device's resilience to sharp bends that can occur under abusive or harsh use of the writing device. In this test, the writing device 70A is bent as illustrated by 70B, in a region of the confined liquid crystal where writing occurs, to a specified radius of curvature R 72 for 10 repetitions. To test for damage, the display is then electronically erased once per repetition. If the writing device is completely erased and initialized for all repetitions, the writing device is deemed resilient for withstanding abusive use. This is because the writing device still performs satisfactorily by completely erasing, even after the abuse of the test. The writing device may be designed to withstand the lesser condition in which the radius of curvature R used in the test is 100 millimeters, even more particularly, the radius of curvature R is a more stringent 50 millimeters. A particular specified radius R is 10 millimeters under the most extreme conditions while satisfying the resiliency test. At each radius of curvature R and optionally within the range of radii of curvature from at least 10 to at least 100 mm, for 10 repetitions, the writing device is erased and totally initialized, confirming it is robust and resilient to abusive or harsh use.

The disclosure will now refer to the Examples which are provided for illustration of particular aspects and should not be used to unduly limit the disclosure.

EXAMPLES

Example 1

A writing device resilient to bending without damage was fabricated incorporating a back support layer comprising three sublayers that include a substrate, an adhesive bond and flexible backer. The substrate was made from 2 mil thick PET (Polyethylene Terephthalate) coated with PEDOT based conductive polymer. This substrate was attached with a PSA to a 10 mil thick red colored Vinyl flexible backer making the back support layer. This back support layer was cut to a dimension of 100 mm by 105 mm. On the conductive side of this layer, an adhesive (Norland 91) was deposited so that it formed a square frame perimeter (100 mm by 100 mm by 1 mm thick) leaving the remaining portion of the conductive layer outside the perimeter for future electrical connection. A mixture of monomers, crosslinkers, photoinitiators, spacers and cholesteric liquid crystal tuned to reflect green light was disposed on the conductive side of the back support layer substrate. The chemistry of this mixture was the same as that in U.S. Pat. No. 8,228,301. The front writing surface layer was a 100 mm by 105 mm, 2 mil clear PET coated with a transparent PEDOT based conductive polymer on one side. The conductive side of this layer was laminated facing the conductive side of the back support layer encapsulating the mixture in the seal perimeter and leaving the remaining portion of the conductive layer outside the perimeter for future electrical connection. This laminate was cured forming a phase separated system of polymer and cholesteric liquid crystal that was sensitive to writing pressure applied to the writing surface as in U.S. Pat. No. 8,228,301.

This laminate was then ready to be used as a writing device. A small electrical field was applied across the liquid crystal layer by connecting a voltage source to the conductors outside the adhesive area (overhanging ledges). A voltage waveform of amplitude to drive the cholesteric liquid crystal from the focal conic texture to the planar texture was applied as known in the prior art (e.g., U.S. Pat. No. 8,228,301) to erase an image. To test the resiliency of this device, the display was written and then clamped on two opposite lengths of the perimeter so that it could be wrapped on a dowel with a radius of 50 mm. The device was bent and straightened on this dowel 10 times, each time checking for functionality, by making sure the active area was able to be written, completely erased and initialized for a new image.

Example 2

A writing device resilient to bending without damage was fabricated incorporating a back support layer comprising 4 mil thick black PET (Polyethylene Terephthalate) coated with PEDOT based conductive polymer. This back support layer was cut to a dimension of 100 mm by 105 mm. On the conductive side of this layer, an adhesive (Norland 91) was deposited so that it formed a square frame perimeter (100 mm by 100 mm by 1 mm thick) leaving the remaining portion of the conductive layer outside the perimeter for future electrical connection. A mixture of monomers, cross-linkers, photoinitiators, spacers and cholesteric liquid crystal tuned to reflect green light was disposed on the conductive side of the back support layer. The chemistry of this mixture was the same as that in U.S. Pat. No. 8,228,301. The front writing surface layer was a 100 mm by 105 mm, 2 mil thick clear PET coated with a transparent PEDOT based conductive polymer on one side. The conductive side of this layer was laminated facing the conductive side of the back support layer encapsulating the mixture in the seal perimeter and leaving the remaining portion of the conductive layer outside the perimeter for future electrical connection. This laminate was cured forming a phase separated system of polymer and cholesteric liquid crystal that was sensitive to writing pressure applied to the writing surface as in U.S. Pat. No. 8,228,301.

This laminate was then ready to be used as a writing device. A small electrical field was applied across the liquid crystal layer by connecting a voltage source to the conductors outside the adhesive area (overhanging ledges). A voltage waveform of amplitude to drive the cholesteric liquid crystal from the focal conic texture to the planar texture was applied as known in the prior art (e.g., U.S. Pat. No. 8,228,301) to erase an image. To test the resiliency of this device, the display was written and then clamped on two opposite lengths of the perimeter so that it could be wrapped on a dowel with a radius of 100 mm. The device was bent and straightened on this dowel 10 times each time checking for functionality, by making sure the active area was able to be written, completely erased and initialized for a new image without appearance of damage.

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. A writing device comprising:
a liquid crystal layer including cholesteric liquid crystal material;
a front electrically conductive layer and a back electrically conductive layer between which said liquid crystal layer is disposed;
a front writing surface layer that is transparent and a back support layer between which said front electrically conductive layer, said back electrically conductive layer and said liquid crystal layer are disposed;
a seal in a shape of a frame disposed around a perimeter of said liquid crystal layer and confining said cholesteric liquid crystal material inside the perimeter;
wherein said cholesteric liquid crystal material changes in texture by application of pressure to said front writing surface layer to create an image;
wherein said front electrically conductive layer and said back electrically conductive layer are adapted to enable a voltage waveform to be applied thereto that erases the image;
wherein said writing device is resilient to bending including twist bending, enabling said writing device to be bent to a radius of curvature of 100.0 millimeters for 10 repetitions of said bending and after each of the repetitions of said bending said voltage waveform completely erases the image, initializing said writing device.

2. The writing device of claim 1 wherein said writing device is resilient to bending enabling said writing device to be bent to a radius of curvature of 50.0 millimeters for 10 repetitions of said bending and after each of the repetitions of said bending said voltage waveform completely erases the image, initializing said writing device.

3. The writing device of claim 1 wherein said writing device is resilient to bending enabling said writing device to be bent to a radius of curvature of 20.0 millimeters for 10 repetitions of said bending and after each of the repetitions of said bending said voltage waveform completely erases the image, initializing said writing device.

4. The writing device of claim 1 wherein said writing device is resilient to bending enabling said writing device to be bent to a radius of curvature of 10 millimeters for 10 repetitions of said bending and after each of the repetitions of said bending said voltage waveform completely erases the image, initializing said writing device.

5. The writing device of claim 1 wherein said front writing surface layer comprises a flexible polymeric material with a thickness that is at least 0.5 mils.

6. The writing device of claim 1 wherein said back support layer is multilayered.

7. The writing device of claim 6 wherein said back support layer comprises a first sublayer comprising a flexible material adjacent to said back electrically conductive layer, a second sublayer comprising a backer that is flexible and a bonding layer located said first sublayer and said second sublayer.

8. The writing device of claim 7 wherein said second sublayer is formed of a different material than said first sublayer.

9. The writing device of claim 7 wherein said first sublayer comprises a flexible polymeric material with a thickness that ranges between 0.5 to 4.5 mils.

10. The writing device of claim 7 wherein said second sublayer comprises a flexible material with a thickness that ranges between 0.1 and 30 mils.

11. The writing device of claim 7 wherein said bonding layer is selected from any one of a pressure sensitive adhesive layer, UV curable adhesive layer, thermally curable adhesive layer, ultrasonic welding layer, and thermoset adhesive layer and combinations thereof.

12. The writing device of claim 11 wherein at least one of said first sublayer and said second sublayer is opaque or semitransparent.

13. The writing device of claim 11 wherein at least one of said first sublayer and said second sublayer has a color.

14. The writing device of claim 11 wherein said at least one of said first sublayer and second sublayer has graphics on at least one side.

15. The writing device of claim 11 wherein said second sublayer is textured on at least one side.

16. The writing device of claim 11 wherein at least one of said first sublayer and said second sublayer is transparent.

17. The writing device of claim 1 comprising exposed terminals and a magnet that underlies said terminals.

18. The writing device of claim 1 comprising a stylus for erasing the image comprising a magnet in the vicinity of stylus terminals.

19. The writing device of claim 1 wherein said back support layer comprises a flexible polymeric material with a thickness that ranges between 0.5 and 30.0 mils.

20. The writing device of claim 1 wherein said back support layer is transparent.

21. The writing device of claim 1 wherein said back support layer is opaque or semitransparent.

22. The writing device of claim 1 wherein said back support layer has a color.

23. The writing device of claim 1 wherein said back support layer has graphics on at least one side.

24. The writing tablet of device 1 wherein said back support layer is textured on at least one side.

25. The writing device of claim 7 wherein said first sublayer has a thickness that ranges between 0.5 to 4.5 mils and said second sublayer has a thickness that ranges between 0.1 to 30 mils.

26. The A writing device of claim 1 wherein said front writing surface layer has a thickness in a range of 0.5 to 4.5 mils and said back support layer has a thickness in a range of 0.6 to 34.5 mils.

27. The writing device of claim 1 wherein said back support layer comprises a first sublayer that is a substrate comprised of polymer and having a thickness ranging from 0.5 to 4.5 mils, a second sublayer having a thickness ranging from 0.1 to 30 mils and a bonding layer located between said first sublayer and said second sublayer, said second sublayer being more distal from a user of said writing device than said first sublayer is from the user of said writing device.

28. The writing device of claim 1 wherein said seal is comprised of elastomeric material, adhesive material or welded material.

29. The writing device of claim 1 comprising ledges and a capsule that encapsulates said ledges, which are integral parts of the writing device.

30. The writing device of claim 29 wherein said capsule comprises erase electronics that apply said voltage waveform, via said ledges, to said front electrically conductive layer and said back electrically conductive layer that erases the image.

31. The writing device of claim 29 wherein said capsule comprises exposed terminals and a circuit that connects said exposed terminals to said front electrically conductive layer and said back electrically conductive layer via said ledges.

32. A writing device comprising:
- a liquid crystal layer including cholesteric liquid crystal material;
- electrically conductive layers between which said liquid crystal layer is disposed;
- a front writing surface layer that is transparent and a back support layer between which said electrically conductive layers and said liquid crystal layer are disposed;
- a seal confining said cholesteric liquid crystal material;
- wherein said cholesteric liquid crystal material changes in texture when writing by application of pressure to said front writing surface layer to create an image;
- wherein said electrically conductive layers are adapted to enable a voltage waveform to be applied thereto that erases the image;
- wherein said writing device is resilient to bending including twist bending and does not include a housing, throughout a region of said confined cholesteric liquid crystal material where writing occurs, enabling said writing device to be bent to a radius of curvature of 100.0 millimeters for 10 repetitions of said bending and after each of the repetitions of said bending said voltage waveform completely erases the image, initializing said writing device.

33. The writing device of claim 32 wherein said back support layer comprises a first sublayer comprising a flexible material adjacent to said back electrically conductive layer, a second sublayer comprising a backer that is flexible and a bonding layer located said first sublayer and said second sublayer.

34. The writing device of claim 33 wherein said bonding layer is selected from any one of a pressure sensitive adhesive layer, UV curable adhesive layer, thermally curable adhesive layer, ultrasonic welding layer, and thermoset adhesive layer and combinations thereof.

35. The writing device of claim 1 comprising another liquid crystal layer stacked over said liquid crystal layer.

* * * * *

UNITED STATES PATENT AND TRADEMARK OFFICE
CERTIFICATE OF CORRECTION

| | |
|---|---|
| PATENT NO. | : 11,886,061 B2 |
| APPLICATION NO. | : 17/567726 |
| DATED | : January 30, 2024 |
| INVENTOR(S) | : Clinton I. Braganza and Hunter Morris |

Page 1 of 1

It is certified that error appears in the above-identified patent and that said Letters Patent is hereby corrected as shown below:

In the Claims

Claim 7, Line 5, change "located said" to "located between said".
Claim 24, Line 1, change "The writing tablet of device 1" to "The writing device of claim 1".
Claim 26, Line 1, change "The A writing device" to "The writing device".
Claim 33, Line 5, change "located said" to "located between said".

Signed and Sealed this
Twentieth Day of May, 2025

Coke Morgan Stewart
*Acting Director of the United States Patent and Trademark Office*